July 27, 1948.                E. R. PRICE                 2,445,862
                    POWER CONTROL UNIT FOR BRAKES
                         Filed March 26, 1945
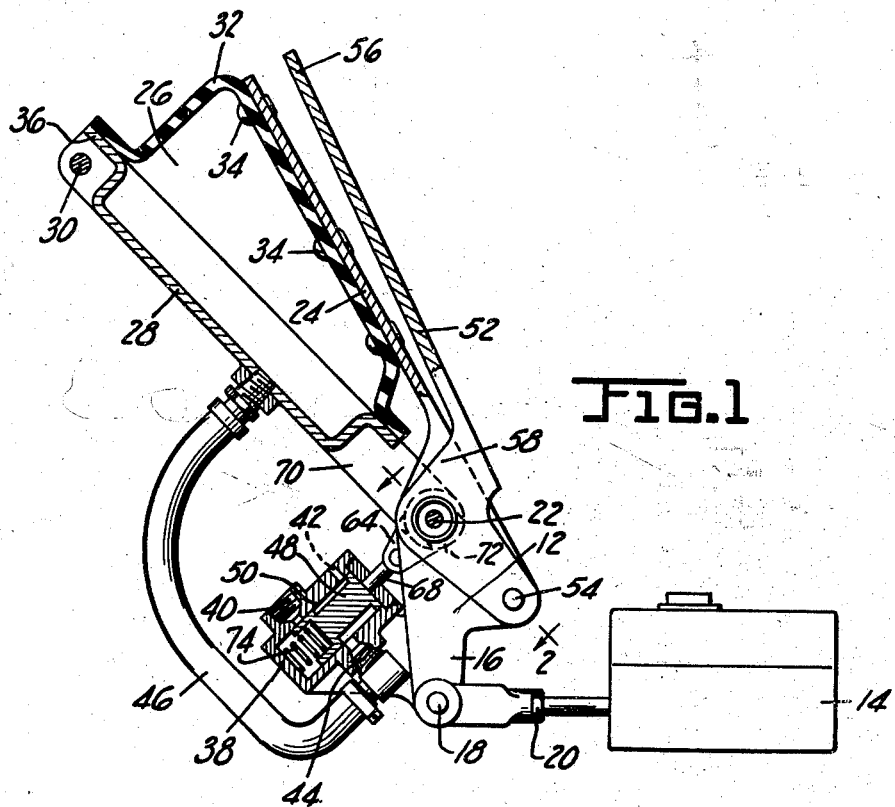
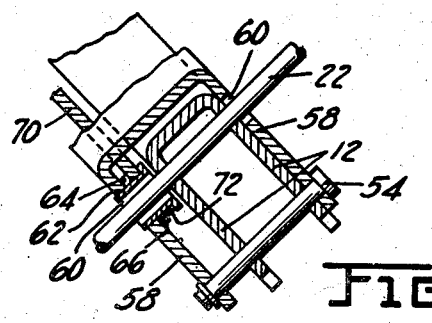
INVENTOR.
EARL R. PRICE
BY
T. J. Plante
ATTORNEY Patented July 27, 1948

2,445,862

UNITED STATES PATENT OFFICE 2,445,862

POWER CONTROL UNIT FOR BRAKES

Earl R. Price, South Bend, Ind., assignor to Bendix Aviation Corporation, South Bend, Ind., a corporation of Delaware Application March 26, 1945, Serial No. 584,847

7 Claims. (Cl. 121—41)

This invention relates to power control units for brakes, and particularly to units of this type wherein the power device is used to assist or boost the manually applied force.

An important object of the present invention is to provide a neat, compact power brake unit which will be particularly applicable to motor vehicles and which will be useful to reduce the pedal pressures, or to reduce the amount of required pedal movement, or, of desired, to accomplish both of these results.

A further object of the present invention is to provide a power unit, as described in the preceding paragraph, which will have the commercially essential attributes—"feel" and "follow-up."

A still further object of the present invention is to obtain the "feel" or reaction in the power brake hookup in a novel and simplified way.

Other objects and advantages of the present invention will become apparent during the course of the following description, reference being had therein to the accompanying drawing, in which:

Figure 1 is a side elevation of a power brake hookup embodying my invention; and Figure 2 is a section taken on the line 2—2 of Figure 1.

Referring to the illustration, a power lever 12 is provided, which is operatively connected to a brake operating device, such as the master cylinder 14. In the illustration, the power lever 12 is a bell crank lever having a downwardly extending arm 16 which is pivotally connected at 18 to a rod 20 which is arranged to actuate the usual master cylinder piston. The lever 12 is fulcrumed on a laterally extending member, such as pin 22, which is rigidly supported in the vehicle body. The upwardly extending portion 24 of the power lever 12 is the part of the lever to which the force of the power device is applied. The power device or power chamber, which is indicated generally at 26 has two movable elements, which are oppositely urged when the pressure condition in the power chamber changes. The pressure exerted through one of these elements acts on the power lever 12, causing it to actuate the brake operating device 14, while the pressure on the other element of the power chamber causes a reaction force against the operator operated member, giving the operator a "feel," indicating brake applying pressure. While this result may be accomplished with various structures within the scope of my invention, in the illustrated embodiment of the invention, the rear wall 28 of the power chamber is fulcrumed at 30 on a fixed part of the vehicle, this arrangement permitting swinging movement of the member 28 under the influence of pressure developed inside power chamber 26. The opposite wall of the power chamber 26 may be formed, as shown, by the upper portion 24 of power lever 12, said upper portion 24 being relatively wide in order to provide a sufficient pressure responsive area. A flexible diaphragm 32 is arranged to seal the interior of power chamber 26, said diaphragm being connected to portion 24 of power lever 12 by means of a plurality of rivets 34, and being connected by suitable means (not shown) to a flange 36 formed on member 28.

Valve means are provided for controlling the operation of power device 26, said valve means preferably being arranged in such a way that the power brake unit has the characteristic of "follow-up." The valve means may comprise a casing 38 mounted on power lever 12, and having a port 40 constituting an inlet port, a port 42 constituting an exhaust port, and a port 44 constituting a controlled pressure port, the port 44 being connected by means of conduit 46 to power chamber 26.

The particular type of pressure which operates the power unit has no direct relation to the present invention. For example, the operation may be accomplished by varying pressures between manifold vacuum and atmospheric, or by varying pressures between atmospheric and compressed air pressure. Furthermore, the invention is applicable either to a power unit in which the brake applying force is created by increasing the pressure prevailing in the power chamber, or a device in which the brake applying force is created by reducing the pressure prevailing in the power chamber. In the illustrated device, I have chosen a power chamber which, while released, is maintained at atmospheric pressure, and from which the air is drawn when brake assistance is required. Therefore, the inlet port 40 is connected to a source of vacuum, such as the usual intake manifold, while the exhaust port 42 is open to the atmosphere. A valve member is provided to control the opening and closing of the ports 40 and 42, or in other words, the connecting and disconnecting of said ports with the port 44. This valve member may comprise a spool valve 48, slidable in the bore 50 provided in valve casing 38.

The control of the valve means is accomplished conjointly by power lever 12 and by a treadle or operator operated member 52. Preferably the treadle 52 is fulcrumed on a member 54 which pivotally connects it to the power lever 12 between fulcrum 22 of the power lever and the pivotal connection 18, the treadle 52 thus being mounted on and "riding" on the power lever. Also, for the sake of appearance, it is desirable that upper portion 56 of the treadle 52, which overlies the upper portion 24 of the power lever 12, be sufficiently wide to cover said power lever and the diaphragm 32, the treadle 52 thus being the only member visible in the operator's compartment.

The treadle 52 is operatively connected to valve member 48 in such a way that movement of the treadle relative to power lever 12 actuates the power chamber 26, while subsequent movement of the power lever as a result of the pressure change in power chamber 26 causes the valve casing 38 to "follow-up" the valve member 48 and eventually bring the valve to lapped position. Furthermore, the connection between treadle 52 and valve member 48 is so arranged that a sufficient clearance is provided to permit treadle 52 to operate the valve, but after this clearance has been taken up, the treadle 52 is directly mechanically connected to the power lever and to the brake operating device 14 in such a way as to apply the brakes by manual pressure only, in case of power failure. A structure which has these characteristics is illustrated in the drawing. The treadle 52 is provided with side portions 58 which are folded over to extend on opposite sides of power lever 12. Each of the side portions 58 is provided with a lost motion opening 60, into one of which is inserted a bushing 62. Through the openings 60 extends the fulcrum member 22 of power lever 12, a clearance being provided between the inner edge of each opening and said member 22 in order to allow sufficient relative movement of treadle 52 and power lever 12 to operate the valve. A link 64, which is provided with an opening 66 fitting the exterior of bushing 62, together with a rod 68, interconnect valve member 48 with said bushing. A downwardly extending arm 70 formed integral with the wall 28 of power chamber 26 is provided with a notch 72 which receives the bushing 62, thus furnishing a direct mechanical connection between wall 28 of the power chamber and treadle 52.

Operation of the unit is as follows. In released position, valve member 48 is so located that power chamber 26 is connected to atmosphere through port 42, power lever 12 being retained in released position by the springs in the brake system, such as the spring in master cylinder 14 (not shown), and treadle 52 being retained in released position by a spring 74.

When the operator wishes to apply the brakes, he presses downwardly on portion 56 of brake treadle 52, thus moving valve member 48, while the power lever and valve casing 38 momentarily remain stationary. This movement of valve member 48 cuts off atmosphere port 42, and opens vacuum port 40, thus causing air to be withdrawn from power chamber 26. The result of this withdrawal of air is two-fold. First of all, the portion 24 of power lever 12 is drawn downwardly, said portion 24 in effect being a piston, thus moving power lever 12 in a counter clockwise direction about its fulcrum 22 to move rod 20 and develop pressure in master cylinder 14, applying the brakes. At the same time, the withdrawal of air from power chamber 26 urges wall member 28 of the power chamber to move in a counter-clockwise direction about its fulcrum 30, thereby exerting a force through extension 70 and bushing 62 against the treadle 52. This force against the treadle acts against the force of the operator, and constitutes a reaction or "feel" which is proportional to the brake applying effort, and thereby apprises the operator as to the amount of said brake applying effort. In order to overcome this reactionary force and continue movement of treadle 52 against such force, the operator must increase the force which he applies to the treadle, and this force acting through member 54, which pivotally connects treadle 52 to power lever 12, increases the pressure acting through rod 20 to apply the brakes. To see this more clearly, consider that the treadle 52 fulcrums on bushing 62 and exerts a force acting through pin 54 to assist in moving lever 12 in a counterclockwise direction about its fulcrum 22.

As power lever 12 moves in a counterclockwise direction due to evacuation of air from power chamber 64, it moves the valve casing in the direction which has previously been taken by valve member 48. This movement, unless valve member 48 is continuously moved downwardly by travel of treadle 52, will once again close vacuum port 40, thereby bringing the valve to lapped position, and preventing a further change of pressure in power chamber 26 until treadle 52 is again moved. This characteristic is commonly known as "follow-up."

When the operator wishes to release the brakes, he simply lets up on treadle 52, thereby opening atmosphere port 42, and permitting air to flow back into power chamber 26 to bring the parts to their original position.

The simplicity and compactness of my improved power unit is clearly illustrated in the drawing, it being apparent that the entire unit can be accommodated in a minmum space, with the best possible results from the standpoint of operating efficiency and unobtrusiveness of the structure. The addition of power to the manual operating force may be used to reduce the pedal pressure required for a given brake application, or it may be used to make possible a lower, and therefore more convenient initial positioning of the treadle, for example, a position similar to that occupied by the usual accelerator treadle. Of course, any combination of these two results may be obtained, since the additional effort supplied by the power device is equally efficacious either in reducing pedal travel or in reducing pedal pressure.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A power brake control mechanism comprising a power lever fulcrumed on a fixed member and pivotally connected to a brake operating device, an operator operated lever pivotally mounted on the power lever at a distance from the fulcrum of said power lever, a power device pivoted on a fixed member and having two movable parts which are urged in opposite directions by a change of pressure in said power device, one of the movable parts of the power device being pivotally connected to the power lever to exert a brake operating force therethrough, and the other of said movable parts being connected to the operator operated lever to exert a force thereon acting against the operator, and valve means for controlling pressure conditions in the power device and having two relatively movable parts, one of which is movable with the power lever and the other of which is moved by the operator operated lever, the movement of the latter part of the valve means in a given direction relative to the former part serving to connect the power device to a pressure source, and the subsequent follow-up movement of the former part of the valve means with the power lever tending to cut off the connection.

2. A power brake control mechanism comprising a power lever fulcrumed on a fixed member and pivotally connected to a brake operating device, an operator operated lever pivotally mounted on the power lever at a distance from the fulcrum of said power lever, a power chamber having two movable walls which are oppositely urged by a change of pressure in said chamber, one of the movable walls of the power chamber being connected to the power lever to exert a brake operating force therethrough, and the other of said movable walls being connected to the operator operated lever to exert a force thereon acting against the operator, and valve means for controlling pressure conditions in the power chamber and having two relatively movable parts, one of which is movable with the power lever, and the other of which is moved by the operator operated lever, the movement of the latter part of the valve means in a given direction relative to the former part serving to connect the power chamber to a pressure source, and the subsequent follow-up movement of the former part of the valve means with the power lever tending to cut off the connection.

3. A power brake unit for a vehicle comprising a power operated bell crank lever fulcrumed on a fixed member and having a downwardly extending arm pivotally connected to a brake operating member, and an arm extending upwardly into the operator's compartment, a treadle pivotally mounted on the downwardly extending arm of the power lever and having a portion overlying the upper extending arm of the power lever and adapted to be moved by the operator's foot, a power chamber having a nonflexible rear wall pivotally mounted at its upper end on a fixed part of the vehicle and mechanically connected at its lower end to the treadle between the points where the operator's force is applied and the pivotal connection of the treadle to the power lever, a diaphragm secured to said rear wall to complete said power chamber and also secured to the upper arm of the power lever, a valve casing mounted on the power lever and having a port opening to a vacuum source, a port opening to atmosphere, and a control port, a conduit connecting said control port to the power chamber, a valve member in said casing normally positioned to connect said power chamber to atmosphere but movable to disconnect said power chamber from atmosphere and connect it to the vacuum source, thereby causing the diaphragm portion of the power chamber to move the power lever in a direction to actuate the brake operating device and simultaneously urging the non-flexible wall of the power chamber against the treadle to oppose the force of the operator, and a connection between the treadle and the valve member for operating the latter.

4. A power brake unit for a vehicle comprising a power operated bell crank lever fulcrumed on a fixed member and having a downwardly extending arm pivotally connected to a brake operating member, and an arm extending upwardly into the operator's compartment, a treadle pivotally mounted on the downwardly extending arm of the power lever and having a portion overlying the upper extending arm of the power lever and adapted to be moved by the operator's foot, a power chamber having a non-flexible rear wall pivotally mounted at its upper end on a fixed part of the vehicle and mechanically connected at its lower end to the treadle between the point where the operator's force is applied and the pivotal connection of the treadle to the power lever, a diaphragm secured to said rear wall to complete said power chamber and also secured to the upper arm of the power lever, a valve casing mounted on the power lever and having a port opening to a vacuum source, a port opening to atmosphere, and a control port, a conduit connecting said control port to the power chamber, a valve member in said casing normally positioned to connect said power chamber to atmosphere but movable to disconnect said power chamber from atmosphere and connect it to the vacuum source, thereby causing the diaphragm portion of the power chamber to move the power lever in a direction to actuate the brake operating device and simultaneously urging the non-flexible wall of the power chamber against the treadle to oppose the force of the operator, a connection including a link between the treadle and the valve member for operating the latter, and a bushing supported by the treadle through which extends the fixed member on which the power lever is fulcrumed and to which the link is connected, said bushing having a slight clearance with respect to said fixed member, and the treadle having a slight initial clearance from the power lever in order that the treadle may move a distance relative to the power lever sufficient to operate the valve, but in case of power failure the treadle after taking up the clearance will fulcrum on said fixed member to actuate the brake operating device by direct manually applied force.

5. A power brake unit for a vehicle comprising a power operated bell crank lever fulcrumed on a fixed member and having a downwardly extending arm pivotally connected to a brake operating member, and an arm extending upwardly into the operator's compartment, a treadle pivotally mounted on the downwardly extending arm of the power lever and having a portion overlying the upper extending arm of the power lever and adapted to be moved by the operator's foot, a power chamber having a non-flexible rear wall pivotally mounted at its upper end on a fixed part of the vehicle and mechanically connected at its lower end to the treadle between the point where the operator's force is applied and the pivotal connection of the treadle to the power lever, a diaphragm secured to said rear wall to complete said power chamber and also secured to the upper arm of the power lever, a valve casing mounted on the power lever and having a port opening to a vacuum source, a port opening to atmosphere, and a control port, a conduit connecting said control port to the power chamber, a valve member in said casing normally positioned to connect said power chamber to atmosphere but movable to disconnect said power chamber from atmosphere and connect it to the vacuum source, thereby causing the diaphragm portion of the power chamber to move the power lever in a direction to actuate the brake operating device and simultaneously urging the non-flexible wall of the power chamber against the treadle to oppose the force of the operator, and a connection between the treadle and the valve member for operating the latter, said treadle having a sufficient initial clearance from said power lever to permit operation of the valve, but being arranged to pick up the power lever after predetermined movement in order to actuate the brake operating device by direct manually applied force in case of power failure.

6. A power brake control mechanism comprising a power lever fulcrumed on a fixed member and pivotally connected to a brake operating device, an operator operated lever pivotally mounted on the power lever at a distance from the fulcrum of said power lever, and a power device on a fixed member and having two movable parts which are urged in opposite directions by a change of pressure in said power device, one of the movable parts of the power device being pivotally connected to the power lever to exert a brake operating force therethrough, and the other of said movable parts being connected to the operator operated lever to exert a force thereon acting against the operator.

7. A power brake unit for a vehicle comprising a power operated bell crank lever fulcrumed on a fixed member and having a downwardly extending arm pivotally connected to a brake operating member, and an arm extending upwardly into the operator's compartment, a treadle pivotally mounted on the downwardly extending arm of the power lever and having a portion overlying the upper extending arm of the power lever and adapted to be moved by the operator's foot, a power chamber having a non-flexible rear wall pivotally mounted at its upper end on a fixed part of the vehicle and mechanically connected at its lower end to the treadle between the point where the operator's force is applied and the pivotal connection of the treadle to the power lever, and a diaphragm secured to said rear wall to complete said power chamber and also secured to the upper arm of the power lever.

EARL R. PRICE.

REFERENCES CITED

The following references are of record in the file of this patent:

UNITED STATES PATENTS

| Number | Name | Date |
| --- | --- | --- |
| 1,978,738 | Bragg | Oct. 30, 1934 |
| 2,010,477 | Bragg | Aug. 6, 1935 |
| 2,207,700 | Porter | July 16, 1940 |
| 2,222,886 | Voight | Nov. 26, 1940 |